United States Patent [19]
Kikuchi et al.

[11] 3,956,627
[45] May 11, 1976

[54] LIGHT BEAM TARGET AND APPARATUS USING THE SAME

[75] Inventors: Takayuki Kikuchi, Chigasaki; Yukihiro Kawai, Tama; Iwao Takanashi, Koganei, all of Japan

[73] Assignee: Nishi Nippon Denki Co., Ltd., Osaka, Japan

[22] Filed: Oct. 29, 1974

[21] Appl. No.: 518,801

[52] U.S. Cl. ............................ 250/209; 250/214 R; 273/1 E; 340/366 D; 340/371; 340/381; 250/203 R
[51] Int. Cl.² ................................. H01J 39/12
[58] Field of Search .......... 250/206, 208, 209, 214, 250/211 J; 340/366 D, 371, 373, 378 R, 381; 315/149, 153, 155; 273/1 E, 1 ES; 356/152, 172

[56] References Cited
UNITED STATES PATENTS

| | | | |
|---|---|---|---|
| 3,435,232 | 3/1969 | Sorensen | 250/211 J X |
| 3,651,252 | 3/1972 | Land et al. | 250/209 X |
| 3,819,273 | 6/1974 | Unema et al. | 356/172 X |

Primary Examiner—Alfred E. Smith
Assistant Examiner—E. R. LaRoche
Attorney, Agent, or Firm—Marshall & Yeasting

[57] ABSTRACT

A light beam target for light beam shooting and apparatus employing it are disclosed. The light beam target has a light transparent target plate, stripe-like first and second X- and Y-axis photoelectric conversion elements and a compensating photoelectric conversion element disposed on the back of the target plate. When a light beam is projected onto the target plate, the first and second X- and Y-axis photoelectric conversion elements provide first and second X- and Y-axis electric signals corresponding to the position of the center of the light beam on the target plate. The apparatus using such light beam target has a circuit for producing X- and Y-axis light beam center indicating signals indicative of the position of the center of the light beam on the target plate based on the first and second X- and Y-axis electric signals and a device for displaying on an indicator plate the position of the center of the light beam on the target plate.

4 Claims, 6 Drawing Figures

LIGHT BEAM TARGET AND APPARATUS USING THE SAME

BACKGROUND OF THE INVENTION

This invention relates to a light beam target adapted to be irradiated by a light beam emitted from a light beam gun and apparatus employing such a light beam target.

SUMMARY OF THE INVENTION

According to the light beam target of this invention, an electric signal indicative of the center of a light beam projected onto the light beam target can be obtained with a simple construction. Further, even if light beams of different intensities are projected, the above signal can be obtained without any errors.

According to the apparatus of this invention employing such a light beam target, the position of the center of the light beam on the light beam target can be indicated accurately and clearly with a simple construction.

According to the apparatus of this invention, the amount of deviation of the center of a light beam from the center of the light beam target can be accurately obtained with a simple construction.

DESCRIPTION OF THE PREFERRED EMBODIMENTS

With reference to the drawings, this invention will hereinafter be described in detail.

Figure 1:
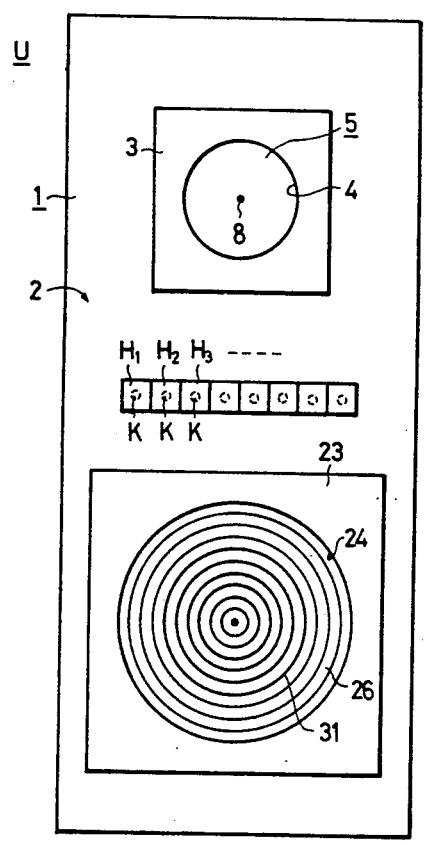
FIG. 1 is a front view schematically illustrating one example of a target apparatus for light beam shooting according to this invention.
Figure 2:
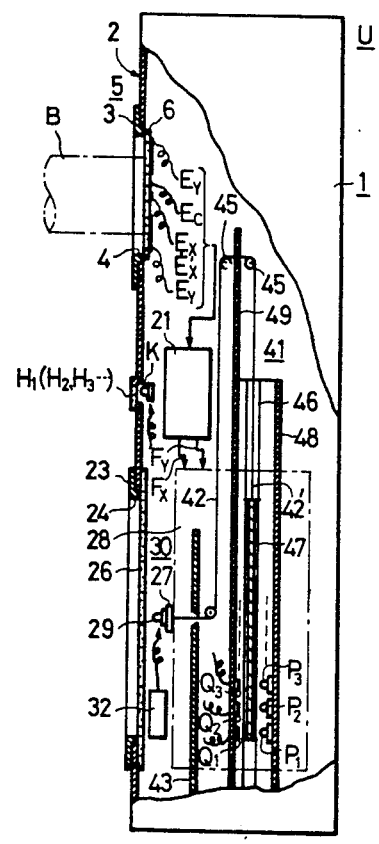
FIG. 2 is a side view, partly cut away, of the target apparatus shown in FIG. 1.

In FIGS. 1 and 2, reference character U indicates generally a target apparatus for light beam shooting according to this invention. The target apparatus U has a case member 1 and its front panel 2 has formed therein a circular window 4 at the center of its upper part, the window 4 being framed with a frame 3 of square configuration. A light beam target 5 is disposed on the inside of the case member 1 to be exposed to the outside through the window 4.

Figure 3:
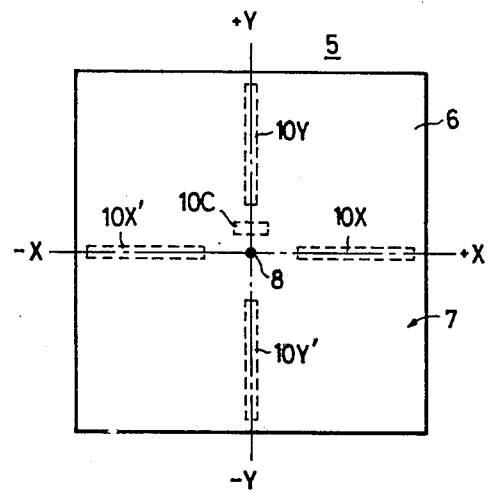
FIGS. 3, 4 and 5 are front, rear and side views showing one example of a light beam target applicable to this invention, respectively.
Figure 5:
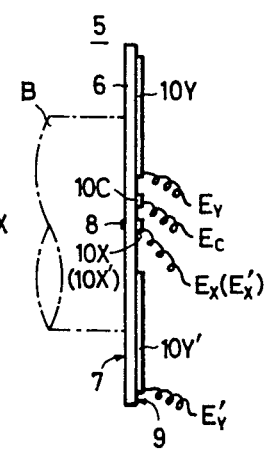
Figure 4:
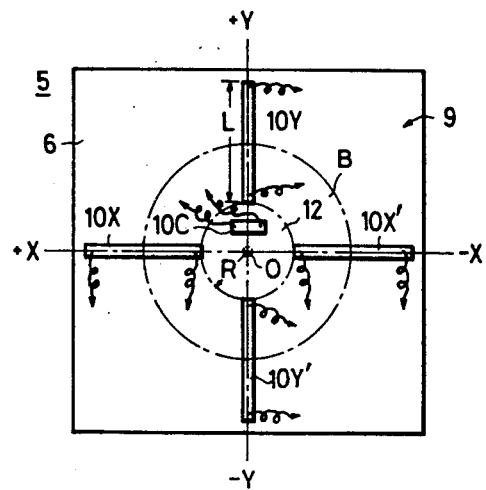

As is evident from FIGS. 3 to 5, the light beam target 5 has a target plate 6 which is for example, milk-white and light-transparent. The target plate 6 has a target central point marker 8 on its front 7 at the center thereof. On the back 9 of the target plate 6, there are disposed first and second X-axis photoelectric conversion elements 10X and 10X' and first and second Y-axis photoelectric conversion elements 10Y and 10Y' of the same size and configuration and a compensating photoelectric conversion element 10C. The target plate 6 having such photoelectric conversion elements 10X, 10X', 10Y, 10Y' and 10C thus disposed thereon is mounted on the inside of the front panel 2 to close the window 4 with the center of the marker 8 in agreement with that of the window 4. The target plate 6 is irradiated by a light beam B. Based on the irradiation by the light beam B, the photoelectric conversion elements 10X and 10X' and 10Y and 10Y' respectively derive therefrom first and second electric signals $E_x$ and $E_x'$ for the X-axis and first and second electric signals $E_y$ and $E_y'$ for the Y-axis which correspond to the center of the light beam B on the target plate 6, and the photoelectric conversion element 10C derives therefrom an electric signal $E_c$ for compensation.

In this case, the photoelectric conversion elements 10X, 10X', 10Y, 10Y' and 10C are disposed on the back 9 of the target plate 6 in the following relation to one another. Now, let it be assumed that imaginary XY rectangular co-ordinates pass through an imaginary center O of the back 9 of the target plate 6 corresponding to the center of the marker 8 on the front 7. The photoelectric conversion elements 10X and 10X' and 10Y and 10Y' are disposed on positive and negative X- and Y-axis lines of the X- and the Y-axis of the XY rectangular co-ordinates centering about the center O thereof to extend in directions of the X- and the Y-axis, respectively, with their marginal edges on the side of the center O being spaced the same distance R away from the center O. Further, the photoelectric conversion element 10C is disposed within a circular area 12 whose radius is the aforesaid distance R, centering about the center O of the back 9 of the target plate 6.

Accordingly, in the case where the light beam has a circular section and its radius $\phi$ is such that $\phi \approx (L/2 + R)$
in relation to the lengths L of the photoelectric conversion elements 10X, 10X', 10Y and 10Y' and the radius R of the area 12, if the center of the light beam B is in the center of the marker 8 of the target plate 6, the values of the resulting electric signals $E_x$, $E_x'$, $E_y$ and $E_y'$ are equal to one another. If the center of the light beam B is deviated from that of the marker 8 (assume that a maximum amount of deviation is L/2 in the positive and negative directions of the X- and Y-axis lines), the values of the electric signals vary with the amount of deviation. Accordingly, if the values of the electric signals $E_x$, $E_x'$, $E_y$ and $E_y'$ are generally taken as $e_x$, $e_x'$, $e_y$ and $e_y'$, respectively, and if their values when the center of the light beam B lies at the center of the marker 8 of the target plate 6 are each taken as $e_0$, normalized values $N_x$, $N_x'$, $N_y$ and $N_y'$ which are given in the form of $e_x/e_0$, $e_x'/e_0$, $e_y/e_0$ and $e_y'/e_0$, respectively, are obtained as unity when the center of the light beam B is in agreement with that of the marker 8 of the target plate 6. When the center of the light beam B is deviated from the center of the marker 8 in the positive (or negative) direction of the X-axis, the normalized values $N_x$ and $N_x'$ are respectively larger (or smaller) and smaller (or larger) than unity in accordance with the amount of deviation but the normalized values $N_y$ and $N_y'$ remain unchanged. On the other hand, when the center of the light beam B is deviated from the center of the marker 8 in the positive (or negative) direction of the Y-axis, the normalized values $N_x$ and $N_x'$ remain unchanged but the normalized values $N_y$ and $N_y'$ are respectively larger (or smaller) and smaller (or larger) than unity in accordance with the amount of deviation.

If the light beam B has the circular section having the radius $\phi$ and if the maximum amount of deviation of the center of the light beam B from that of the marker 8 on the target plate 6 is the aforementioned value L/2, the electric signal for compensation is obtained in the form of a constant value $e_c$. Accordingly, if those values $N_x/e_c$, $N_x'/e_c$, $N_y/e_c$ and $N_y'/e_c$ which are obtained by dividing the aforesaid normalized values $N_x$, $N_x'$, $N_y$ and $N_y'$ by $e_c$ are taken as $M_x$, $M_x'$, $M_y$ and $M_y'$ in place of the above normalized values $N_x$, $N_x'$, $N_y$ and $N_y'$, they can be obtained as values that the influence by a change in the intensity of the light beam B has been compensated for.

Further, the case member 1 has disposed therein a light beam center indicating signal generating circuit 21. This circuit 21 is adapted to provide a signal $F_x$ which is composed of a corresponding number of clock pulses $CP_x$ to the value of $(M_x - M_x')$ and a binary signal $D_x$ corresponding to its polarity and a signal $F_y$ which is composed of a corresponding number of pulses $CP_y$ to the value of $(M_y - M_y')$ and a binary signal $D_y$ corresponding to its polarity, based on the electric signals $E_x$, $E_x'$, $E_y$, $E_y'$ and $E_c$. In this case, $M_x$, $M_x'$, $M_y$ and $M_y'$ are given in the following forms:

$$M_x = \frac{e_x}{e_0 \cdot e_c}, \quad M_x' = \frac{e_x'}{e_0 \cdot e_c}$$

$$M_y = \frac{e_y}{e_0 \cdot e_c} \text{ and } M_y' = \frac{e_y'}{e_0 \cdot e_c}$$

based on the general values $e_x$, $e_x'$ and $e_y$, $e_y'$ of the electric signals $E_x$, $E_x'$ and $E_y$, $E_y'$ respectively derived from the photoelectric conversion elements 10X, 10X' and 10Y, 10Y' which are respectively disposed on the aforesaid positive and negative X- and Y-axis lines of the X- and the Y-axis of the imaginary XY rectangular co-ordinates passing through the imaginary center O of the target plate 6, the specified value $e_0$ obtained when the center of the light beam B is in agreement with that of the marker 8 of the target plate 6, and the value $e_c$ of the electric signal $E_c$ derived from the photoelectric conversion element 1OC disposed in the aforementioned area 12. Therefore, the signals $F_x$ and $F_y$ can be regarded as X- and Y-axis light beam center indicating signals which are indicative of the center of the light beam B on the target plate in the imaginary XY rectangular co-ordinates passing through the imaginary center O on the back 9 of the target plate 6.

Further, a circular window 24 framed with a square-shaped frame 23 is formed in the front panel 2 of the case member 1 at the center of its lower portion. An indicator plate, which is, for example, milk-white, and light transparent, is disposed on the inside of the case member 1 to be exposed to the outside through the window 24. On the other hand, there is provided in the case member 1 a known pulse-driven XY driver 28 which has an output slider 27 mounted on an imaginary plane V—V parallel to the indicator plate 26. The output slider 27 has mounted thereon a light-emissive element 29. Thus, a light beam center indicating device 30 is formed including the indicator plate 26, the XY driver 28 and the light-emissive element 29.

In this case, the front of the indicator plate 26 has provided thereon a plurality of concentric circular indications about the center of the indicator plate 26. The indicator plate 26 is mounted on the inside of the front panel 2 to close the window 24, with the center of the circular indications 31 being in agreement with that of the window 24. The XY driver 28 is designed such that when it is supplied with the aforementioned signals $F_x$ and $F_y$, the output slider 27, and consequently the light-emissive element 29 moves in the X- and Y-axis directions from its normal position, where its center lies at an imaginary center O' corresponding to the center of XY rectangular co-ordinates on the indicator plate 26 on the imaginary plane V—V, to a position corresponding to the signals $F_x$ and $F_y$ and automatically returns to the normal position a predetermined period of time after staying at that position. The light-emissive element 29 is adapted to be energized by an energizing circuit 32 from an instant when the element 29 starts to move from its normal position to an instant a little after it has reached the position corresponding to the signals $F_x$ and $F_y$. In this case, however, the light-emissive element 29 is controlled so that its brightness is low while it is moving but high as predetermined after it reaches the position corresponding to the signals $F_x$ and $F_y$.

Accordingly, where the light beam B is projected onto the target plate 6, if the center of the light beam B is in agreement with the center of the marker 8 on the target plate 6, the light-emissive element 29 is brought to a position corresponding to the center of the circular indications 31 on the indicator plate 26. If the center of the light beam B is deviated from the center of the marker 8, the light-emissive element 29 is deviated from the position corresponding to the center of the circular indications 31 of the indicator plate 26 in accordance with the amount of deviation of the center of the light beam B from the center of the marker 8 including a direction of the deviation therefrom. Thus, the position of the center of the light beam B projected onto the target plate 6 is displayed on the indicator plate 26.

Further, a device 41 for detecting the amount of deviation of a moving member is provided in the case member 1. In the device 41, a flexible wire 42 is led out from the aforesaid output slider 27 of the XY driver 28, which serves as the moving member, and guided through a wire guide hole 44 formed in a vertical fixed plate 43 planted in the case member 1, and trained about guide pulleys 45 mounted on the fixed plate 43 and another vertical fixed plate 49 opposite thereto, and suspended. For example, the free end of the suspended part 42' of the wire 42 has connected thereto a light shielding plate 47 which is guided by a guide rail 46 mounted on the fixed plate 49 to be movable up and down in parallel therewith. In this case, as is apparent from FIGS. 2 and 6, the position of the wire guide hole 44 in the fixed plate 43 is selected such that when the center of the light-emissive element 29 assumes the position corresponding to the center of the indications on the indicator plate 26, the distance between the point of attachment of the wire 42 to the slider 27 and the center of the wire guide hole 44 may be minimum.

Figure 6:
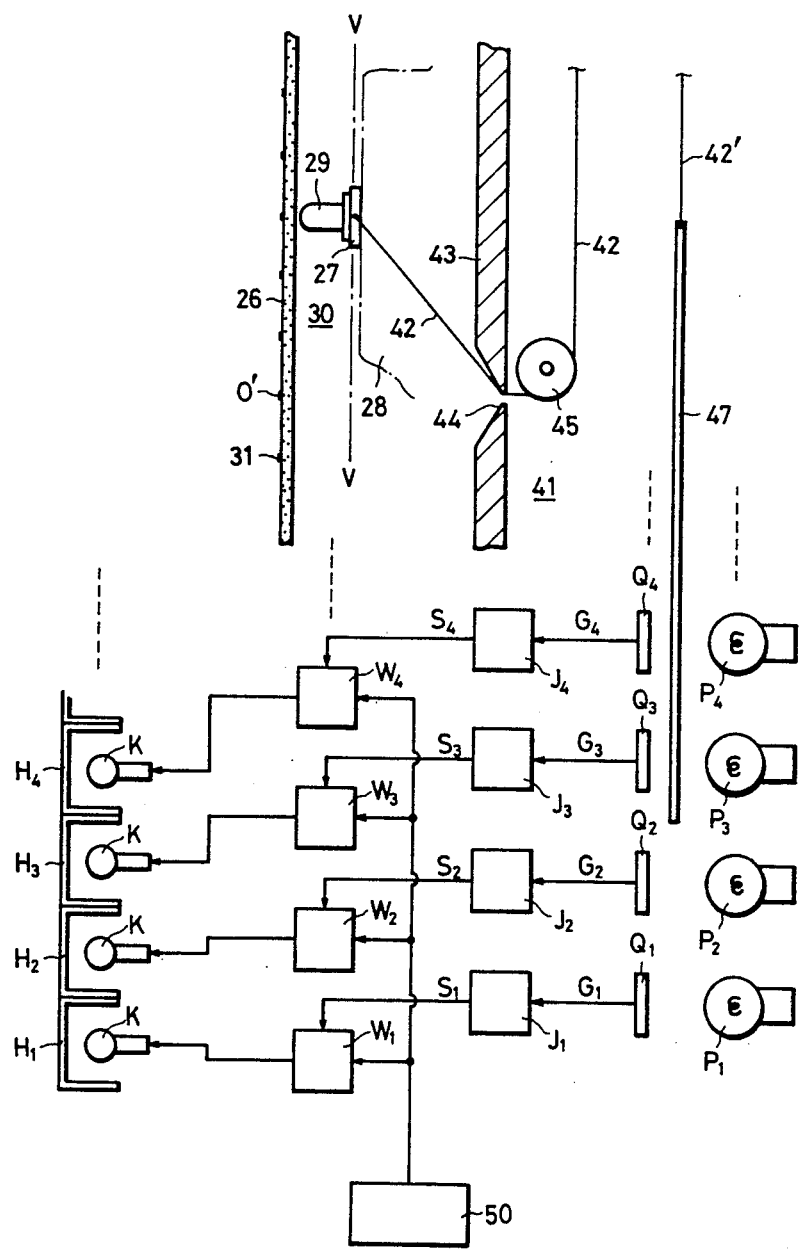
FIG. 6 is a schematic diagram illustrating one example of the principal part of means for obtaining an electric signal indicative of the amount of deviation of a light beam and one example of means for indicating the amount of deviation of the light beam which are applicable to this invention.

Opposite to the fixed plate 49, a support plate 48 is disposed, on which a plurality of light-emissive elements $P_1$, $P_2$, . . . are arranged upwardly along a vertical line in opposing relation to the fixed plate 49 through a plane including the light shielding plate 47. On the other hand, photoelectric conversion elements $Q_1$, $Q_2$, . . . are disposed on the fixed plate 49 at those positions corresponding to the light-emissive elements $P_1$, $P_2$, . . . Electrical signals $G_1$, $G_2$, . . . derived from these photoelectric conversion elements $Q_1$, $Q_2$, . . . are supplied to response circuits $J_1$, $J_2$, . . . as shown in FIG. 6. The response circuits $J_j$ ($j = 1, 2, \ldots$) provide electric digital signals $S_1$, $S_2$, . . . in the form of a binary indication 1 or 0 depending upon whether or not the light shielding plate 47 is interposed between the elements $P_j$ and $Q_j$. In this case, when the center of the light-emissive element 29 lies at the position opposite to the center of the indications 31 on the target plate 26, the light shielding plate 47 is interposed between all of the elements $P_1, P_2, \ldots$ and all of the elements $Q_1, Q_2, \ldots$ and, when the center of the light-emissive element 29 is deviated from the center of the indications 31, the shielding plate is gradually moved up with an increase in the amount of deviation.

At the central part of the case member 1, display elements $H_1, H_2, \ldots$, each having incorporated therein a light-emissive element K, are aligned in a lateral direction. As illustrated in FIG. 6, these display elements $H_1, H_2 \ldots$ are connected to a power source 50 through switching circuits $W_1, W_2, \ldots$, respectively. The switching circuits $W_1, W_2, \ldots$ are controlled to be turned on or off depending upon whether the digital signals $S_1, S_2, \ldots$ are 1 or 0.

Accordingly, in the case where the light-emissive element 29 assumes the position opposite to the center of the circular indications 31 on the indicator plate 26, the light-emissive elements K of the display elements $H_1, H_2, \ldots$ are all lighted. Even if the light-emissive element 29 is deviated in any direction from the position opposite to the center of the circular indications 31 on the target plate 26, since the light shielding plate 47 is moved only upwardly in accordance with the amount of deviation, only the light-emissive element or elements K of the display element or elements H except those counted upwardly from the lowermost display element $H_1$ corresponding in number to the amount of deviation are lighted. Accordingly, the amount of deviation of the light beam B from the center of the target plate 6 is displayed by the display elements $H_1, H_2, \ldots$ As has been described in the foregoing, according to this invention, the position of the center of a light beam on the target plate can be indicated and the indication is produced at a predetermined brightness after brought to a position where it is finally provided. This avoids ministerpretation of the indication. Further, the amount of deviation of the center of the light beam is also indicated. Therefore, this invention is very advantageous in practical use.

It will be apparent that many modifications and variations may be effected without departing from the scope of the novel concepts of this invention.

We claim as our invention:

1. An apparatus employing a light beam target comprising means for generating an X-axis light beam center indicating signal indicative of the position of the center of the light beam on a target plate in the X-axis direction based on first and second X-axis electric signals derived from said light beam target and a Y-axis light beam center indicating signal indicative of the position of the center of said light beam on said target plate in the Y-axis direction based on first and second Y-axis electric signals derived from said light beam target; and means for displaying the position of the center of the light beam, said means including a light transparent indicator plate, an XY driver having an output slider movable on an imaginary plane parallel with said light transparent indicator plate and a light-emissive element mounted on the output slider of said XY driver, in which said X- and Y-axis light beam center indicating signals are supplied to said XY driver, whereby the position of the center of the light beam on said target plate is displayed on said light transparent indicator plate.

2. An apparatus according to claim 1, wherein said light-emissive element is energized to provide a predetermined brightness after it is moved to a position where the position of the center of the light beam on said target plate is indicated.

3. An apparatus according to claim 1, which further comprises means for producing an electric signal indicative of the amount of deviation of the center of the light beam from the center of said target plate in response to the position of the output slider of said XY driver; and means for indicating the amount of deviation of the center of the light beam from the center of said target plate based on the electric signal derived from said electric signal producing means.

4. An apparatus according to claim 1, wherein a wire is led out from said output slider, guided through a fixed wire guide hole opposite to said imaginary center, trained about fixed pulleys and suspended, a movable member is connected to the suspended portion of said wire, whereby the radial deviation of said output slider from said imaginary center is indicated by the position of the movable member.

* * * * *

UNITED STATES PATENT AND TRADEMARK OFFICE
CERTIFICATE OF CORRECTION

PATENT NO. : 3,956,627
DATED : May 11, 1976
INVENTOR(S) : TOKAYUKI KIKUCHI, YUKIHIRO KAWAI AND IWAO TAKANASKI

It is certified that error appears in the above-identified patent and that said Letters Patent are hereby corrected as shown below:

On the title page in item [73], after Nishi Nippon Denki Co., Ltd., Osaka, Japan, insert - - and NOMURA ELECTRIC INC., Tokyo Japan.- -.

Signed and Sealed this

Twelfth Day of April 1977

[SEAL]

Attest:

RUTH C. MASON
Attesting Officer

C. MARSHALL DANN
Commissioner of Patents and Trademarks